US008345874B2

(12) United States Patent
Østhassel

(10) Patent No.: US 8,345,874 B2
(45) Date of Patent: Jan. 1, 2013

(54) METHOD AND SYSTEM FOR PROVIDING USERS WITH INFORMATION RELATING TO A POSITION

(76) Inventor: Steinar Østhassel, Vanse (NO)

( * ) Notice: Subject to any disclaimer, the term of this patent is extended or adjusted under 35 U.S.C. 154(b) by 672 days.

(21) Appl. No.: 12/307,248
(22) PCT Filed: Jul. 4, 2007
(86) PCT No.: PCT/NO2007/000259
§ 371 (c)(1),
(2), (4) Date: Dec. 31, 2008
(87) PCT Pub. No.: WO2008/004891
PCT Pub. Date: Jan. 10, 2008

(65) Prior Publication Data
US 2009/0285393 A1 Nov. 19, 2009

(30) Foreign Application Priority Data
Jul. 4, 2006 (NO) .................................. 20063107

(51) Int. Cl.
H04L 29/06 (2006.01)
(52) U.S. Cl. ...................................... 380/255
(58) Field of Classification Search ................. None
See application file for complete search history.

(56) References Cited

U.S. PATENT DOCUMENTS

| 5,930,474 | A | | 7/1999 | Dunworth et al. |
| 6,154,172 | A | * | 11/2000 | Piccionelli et al. .... 342/357.395 |
| 6,856,967 | B1 | * | 2/2005 | Woolston et al. ........... 705/26.3 |
| 7,050,990 | B1 | | 5/2006 | Chu et al. |
| 7,283,846 | B2 | * | 10/2007 | Spriestersbach et al. ..... 455/566 |
| 7,401,025 | B1 | * | 7/2008 | Lokitz ........................... 705/346 |
| 7,813,958 | B1 | * | 10/2010 | Urbanski et al. ........... 705/14.49 |
| 2002/0002552 | A1 | | 1/2002 | Schultz et al. |
| 2002/0023010 | A1 | * | 2/2002 | Rittmaster et al. .............. 705/26 |

(Continued)

FOREIGN PATENT DOCUMENTS

AU 53031/98 A 8/1998

(Continued)

OTHER PUBLICATIONS

"DAML+OIL and RDF Schema representation of UNSPSC," Michel Klein, 2002, http://www.cs.vu.nl/~mcaklein/unspsc/.*

Primary Examiner — Oscar Louie
(74) Attorney, Agent, or Firm — Birch, Stewart, Kolasch & Birch, LLP

(57) ABSTRACT

The invention relates to a system for providing information to a user, comprising: a first database; a first module configured to receive information to be entered in said first database from an information provider, said information including at least data representative of a plurality of geographical codes and data representative of at least one categorical code; a second module configured to receive an information request from a user, said information request including at least data representative of a geographical position and data representative of a categorical preference; and a third module configured to enter information received by said first module in said first database, and to search said first database based on requests received by said second module, retrieve entries where a geographical code corresponds with said geographical position and a categorical code corresponds with said categorical preference, and transmit a presentation of retrieved entries to said user.

30 Claims, 7 Drawing Sheets

U.S. PATENT DOCUMENTS

| | | | |
|---|---|---|---|
| 2002/0055924 A1* | 5/2002 | Liming | 707/100 |
| 2003/0148775 A1* | 8/2003 | Spriestersbach et al. | 455/456 |
| 2004/0054691 A1* | 3/2004 | Sharma et al. | 707/104.1 |
| 2004/0068520 A1 | 4/2004 | Masaoka | |
| 2005/0004948 A1* | 1/2005 | Navar et al. | 707/104.1 |
| 2007/0038950 A1* | 2/2007 | Taniguchi et al. | 715/768 |
| 2007/0061244 A1* | 3/2007 | Ramer et al. | 705/37 |
| 2007/0061245 A1* | 3/2007 | Ramer et al. | 705/37 |
| 2007/0061303 A1* | 3/2007 | Ramer et al. | 707/3 |
| 2007/0198485 A1* | 8/2007 | Ramer et al. | 707/3 |
| 2008/0009268 A1* | 1/2008 | Ramer et al. | 455/412.1 |
| 2009/0055353 A1* | 2/2009 | Meema | 707/3 |
| 2010/0293057 A1* | 11/2010 | Haveliwala et al. | 705/14.66 |

FOREIGN PATENT DOCUMENTS

| | | |
|---|---|---|
| EP | 1 653 382 A2 | 5/2006 |
| WO | WO-00/41090 A1 | 7/2000 |
| WO | WO0165426 | 9/2001 |

* cited by examiner

User ID

Name: John Doe

User name: johndoe09

Password: *******

USANN

| POSITION SOURCE | |
|---|---|
| ☒ GPS | SANN |
| COUNTRY | ¤1¤ |
| STATE | #126# |
| CITY | $4560 |

| ☒ FOOD | ☒ CLOTHING | ☒ SPORTS | ☒ MUSIC | ☐ MEDIA | ☐ TRAVEL |
|---|---|---|---|---|---|
| ☒ CITY | ☐ CITY | ☐ CITY | ☒ CITY | ☐ CITY | ☐ CITY |
| ☐ STATE | ☐ STATE | ☒ STATE | ☐ STATE | ☐ STATE | ☐ STATE |
| ☒ COUNTRY | ☒ COUNTRY | ☐ COUNTRY | ☐ COUNTRY | ☐ COUNTRY | ☐ COUNTRY |

NAME?

METHOD AND SYSTEM FOR PROVIDING USERS WITH INFORMATION RELATING TO A POSITION

The present invention relates to a system for registering, managing and presenting information based on classification. More particularly, the invention relates to a system adapted to allow information by be registered based on a system of classification according to a location and making this information available to users based on the individual user's preferences relative to this classification.

BACKGROUND OF THE INVENTION

The Internet has grown to become a vast compilation of information accessible to user's all over the world. This has created a situation where information on almost any topic is available to people in a manner that was unthinkable not too many years ago. However, this situation gives raise to challenges; the Internet has become an information jungle, and it can be as difficult for information providers to reach their intended audience as it is for information seekers to find the information they need.

Several strategies have been introduced with the purpose of making it easier for user to find the information they seek, and to discriminate between relevant and irrelevant information. One example would be search engines that attempt to index as much information as possible and develop methods for ranking information based on some strategy for measuring relevance. Another alternative is represented by various portals and directories where information is classified such that users may navigate through some hierarchical structure in order to arrive at a set of information pages that is small enough to be manageable.

Certain systems allow users to influence the information they receive by defining a user profile. The user profile can include demographic information about the user or a listing of preferred categories information the user prefers. Information presented to the user will then be selected based on the extent to which each information item fulfills the user profile according to some measurement. It has also been suggested to use the users position as determined by some positioning device carried by the user to select and present information that is considered particularly relevant to the user given the determined position.

Various methods and schemes have also been introduced in order to let information providers present their information to an intended target audience. This is often based on demographic information, to the extent such information is available, and information regarding the user's behavior, to the extent this information can be measured. Often information is simply selected and presented as additional information based on and in combination with information requested by the user.

The various methods and strategies known in the art all suffer from different forms of problems and shortcomings. One such problem is the effect that information often is assumed to be relevant because it was assumed to be relevant in the past, making it difficult for newly added information to take the place of outdated information. Another problem is that it is often difficult to distinguish between reliable and unreliable information, or between information that is relevant to a given user and information that appears relevant but only applies to users belonging to some other demographic. For information providers, one typical problem is that it is difficult to target information to an intended audience. On the Internet one user often looks much like another, with factors such as geographical location, age, interests, nationality, and other demographical identifiers being unavailable to an information provider. Often for reasons of privacy as much as for technological reasons.

No one single strategy for optimizing distribution of information can be expected to be found. Different situations requires different strategies. There is therefore clearly a need for methods and systems that will expand the available range of strategies for an information provider, and, at least on some situations, reduce or even overcome some of the problems associated with the currently available technology.

SUMMARY OF THE INVENTION

The present invention presents a novel method and a system for providing users with information in a manner that combines the user's preferences for certain categories of information with information regarding the user's location. Some features and embodiments that are consistent with principles of the invention are summarized below.

The system may include a first module for receiving information from information providers to be entered in a first database. The information may include data representative of at least one geographical code and data representative of at least one categorical code. A second module may be configured to receive an information request from a user. An information request may including at least data representative of a geographical position and data representative of a categorical preference.

A third module may be configured to administer the first database. The third module enters information received by said first module in said first database, and searches through the database based on requests received by said second module, retrieve entries where a geographical code corresponds with said geographical position and a categorical code corresponds with said categorical preference, and transmit a presentation of retrieved entries to said user.

The first module may be configured to transmit to an information provider a request for information in the form of a markup language input form and receive information submitted by said information provider by means of said input form. The submitted information, or information otherwise received by the first module, may be data representing a location on a computer network, from where the module can download data and extract the geographical and categorical codes from tags included in said downloaded data.

Data representing a location maybe URI of a web page associated with said information provider, and data downloaded from said location may be at least part of the data available from the web page.

The geographical codes may take many forms, but examples includes data that is representative of, at least one of an address, a postal code, a city, a region and a country.

The categorical codes may be representative of a type of goods or a type of services.

A user may be using a terminal provided with positioning means capable of providing a geographical position to be included in an information request. Such positioning means could be a GPS receiver or a cellphone capable of receiving or deriving positioning information from a cellphone network with which it is communicating.

The categorical preference may be specified by the user each time, it may be included in a user profile stored in a terminal the user is operating, or it may in the server as part of a user profile.

The second module may be configured to transmit to a user an invitation to request information in the form of a markup language input form and receive a request for information submitted by said user by means of said input form.

According to some embodiments of the invention, the first module may be configured to receive a request for assignment of a geographical code from an information provider. The system may then comprise a fourth module configured to generate a geographical code in response to the request and to transmit data representative of said geographical code to said information provider.

The data representative of said geographical code may be the code itself, or according to some embodiments of the invention it may be an association with an information provider profile stored in a second database. The geographical code may then be entered as part of the information provider profile in the second database.

The association may be an information provider identification code representing the information provider profile, or alternatively it may be a URI, a prefix part of a URI or a domain name associated with said information provider and stored in the information provider profile.

According to one embodiment, the fourth module may be configured to encrypt the geographical code and to transmit said encrypted code to said information provider as said data representative of said geographical code. The first module will then receive encrypted geographical information that can be decrypted before it is stored in the first database.

The second module may be configured to receive a request for establishment of a user profile including a categorical preference from a user. The system may then include a third database and a fifth module configured to generate a user identification code, enter the user identification code and said categorical preference as part of a user profile in the third database, and transmit the user identification code to the user such that said user identification code can be used as the data representative of a categorical preference in a request for information.

Corresponding steps and actions represent some of the features of the methods of the invention.

The full scope of the present invention is defined by the appended claims. A fuller understanding of the principles of the invention can be gained from the exemplary embodiments. It will be understood that this summary as well as the detailed description below are intended as exemplary and explanatory, and that they are not restrictive of the invention as claimed.

BRIEF DESCRIPTION OF THE DRAWINGS

FIG. 5 illustrates a user interface consistent with principles of the invention;

DETAILED DESCRIPTION OF EXEMPLARY EMBODIMENTS

The present invention is directed at a method and a system for providing users with information based on classification of that information. In particular, the information may be classified based on geographical relevance and retrieved and presented based on the users current position, or alternatively on a virtual position selected by the user. The information, which may originate with one or more information providers, may additionally be classified or categorized according to other criteria, and the user may choose to filter received information based on such additional categorization, or alternatively to search for information which is categorized such as to match the user's preferences.

Figure 1:
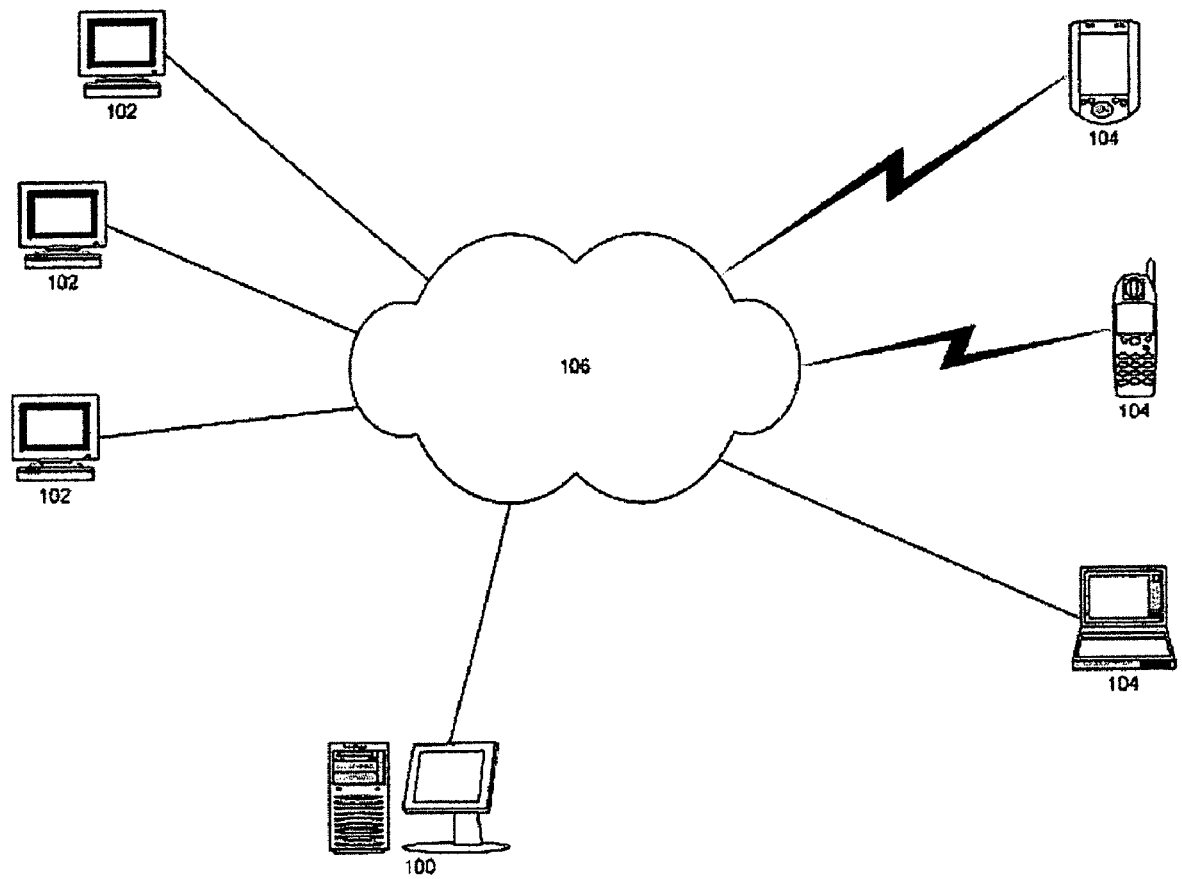
FIG. 1 illustrates a system configured to operate in accordance with the invention.

Reference is made to FIG. 1, which illustrates an exemplary system that is consistent with principles of the invention. This system may include a central server 100, one or more information servers 102, and one or more user client devices 104. According to this exemplary embodiment, the central server 100, the information servers 102 and the client devices 104 may be connected to one or more communication networks 106 in a manner that allows them to establish communication with each other and exchange information. According to principles consistent with the invention, the communications network(s) 106 may be publicly available networks such as the Internet, the public telephone network (PSTN), a cellular network (GSM, CDMA, UMTS or similar), any other wired or wireless network, or a combination of such networks. The examples given below will not distinguish between systems that operate over only one network and systems that operate over interconnected networks. For the purpose of simplifying the description, interconnected networks will be described as one network, but the skilled person will understand that this one network may comprise several interconnected networks or communication links. It should even be noted that the various components of the system may communicate over different networks, such that e.g. the information servers 102 and the central server 100 exchange information over one network, while the client devices 104 and the central server 100 exchange information over a different network.

In summary, a person skilled in the art will realize that the manner in which the communication links between the various components of the system may be established are dependent on design choices and practical limitations, and that the principles of the invention allow for any number of possible configurations.

The actual information provided to a user is not limited by the principles of the invention, and may concern anything and everything, as long as the information provider finds it convenient to associate the information with some geographical association. By way of example, the information may be related to advertising, weather, traffic information, tourist related information, etc.

In accordance with principles consistent with the invention, the geographical categorization may be provided as tags embedded in the information. As an example, the information may be provided in the form of a markup language document (HTML, XHTML, XML or similar), and the markup language may be extended with the necessary tags. However, it is in accordance with principles consistent with the invention to provide the geographical categorization in the form of any kind of meta data embedded in or otherwise associated with the information provided.

An information provider may make information available over one or more information servers 102. By way of example, an information server may be a web server, or some other server capable of delivering or streaming information over a computer network 106. According to principles consistent with the invention, the information may be available to end users directly from the information server 102. Alternatively, the information provider may upload information to the central server 100 and end users may access the information from the central server 100.

The central server 100 may be thought of as a portal or a search engine, as will be described in further detail below. The central server 100 may be equipped to be able to store at least a reference to information provided by an information provider along with the geographical information associated with this information. By way of example, the reference may be an URI referencing the location of the information on an information server 102. However, according to an alternative implementation consistent with the invention, the information itself may be uploaded to and directly available from the central server 100.

A user may then, by way of a user client device 104, send a request for information to the central server 100. The request may include information indicating a geographical position and further criteria specifying what kind of information the user requests.

The client device 104 and the user request will be described in further detail below.

When the central server receives a request, it may be configured to respond by transmitting, to the client device 104, information or one or more references to information that fulfills the criteria indicated in the request, provided that at least one geographical category associated with the information corresponds with the position indicated in the request.

According to a first example consistent with the principles of the present invention, the geographical information, or geographical code, may be embedded in a markup language document by way of the meta-tag. The following simplified code illustrates this alternative.

```
<html>
<head>
<meta name="geography" content="area1, area2" />
</head>
<body>
<p>Brand New Clothes & Son</p>
<p>Visit our stores in your area!</p>
</body>
</html>
```

According to this example, the tag indicates that the information included in the document is relevant in two areas, indicated by the values of the content-attribute, area1 and area2.

According to a second example consistent with the invention, the markup language can be extended with a new geography tag.

```
<message>
<to>Our customers</to>
<from>Brand New Clothes & Son</from>
<heading>Our recent offerings:</heading>
<body>
<geography area="area1">Check out the new bathing suit
collection in our local stores!</geography>
<geography area="area2">Visit our local stores and try our new
mountain hiking boots!</geography>
</body>
</message>
```

According to this example, the geography tag has an attribute that specifies an area, and several elements in the document may have different attributes associated with them.

In both of the examples given above, the geographical area is given as an attribute. Alternatively, the area could be an element in the document:
<geography>area1</geography>

It will be realized by those skilled in the art that additional variations are possible within the scope of the invention. The essential feature of the invention is that information clearly identifying a geographical area can be associated with the information, not the exact form given to this geographical identification or its association with the information. As an additional example, the geographical identification or categorization may even be external to the information, for instance in a database table or a separate file referencing a file, table or entry containing the information. As will be further discussed below, the geographical information does not even have to be stored in the same place as the information delivered by the information provider.

In order for the central server 100 to be able to interpret geographical codes received from a plurality of information providers consistently, the information provides for a system of geographical codes that are administered centrally and that will be used by all information providers.

According to an exemplary embodiment consistent with the principles of the present invention, geographical areas correspond with geographical areas that have already been established by some official authority or some other organization. Examples may include administrative areas such as cities, counties, states, regions or countries, and postal areas as defined by postal codes (zip codes). Geographical codes will then correspond with such an area.

According to a second exemplary embodiment, geographical codes do not correspond with areas, but with a position and a radius. Information may then be associated with any position within that radius.

According to a third exemplary embodiment, a geographical code may only represent a position. The request from the user may then specify a position and a radius within which provided information is considered to be of interest.

It will be realized by those skilled in the art that additional alternatives will be within the scope of the invention. As long as a geographical code can be associated with an information item and can be used to determine whether a given position indicated in a request can be used to determine whether that information item may be relevant for inclusion in a response to that request, any additional features of the system for geographical coding is a matter of design choice.

With an established standardized geographical code, information providers may associate the information they provide with appropriate geographical codes. As an example, one information provider may provide traffic information for an entire country and associate each information item with a geographical code such that the information will only be provided to users requesting information with a given geographical code.

A different example could be a vendor that is localized in a particular area and only wants his advertising to reach users also in that area. And according to a third example, a chain of stores could be located in a number of distinct areas, but not in others, and their advertising could be associated with several codes representing each area.

As described above, the geographical codes may represent several levels, e.g. city, state and country. In any embodiment of the invention where this is the case, some information providers may provide information only locally, while others may provide their information on e.g. a national level. A user requesting information that otherwise fulfills desired criteria will then be provided from information providers local to the users position as well as from information providers on a national level.

According to principles consistent with such an embodiment of the invention, the user may be able to indicate if information is desired for all geographical levels, e.g. from local, regional and national information providers, or only from some of the available levels.

Figure 2:
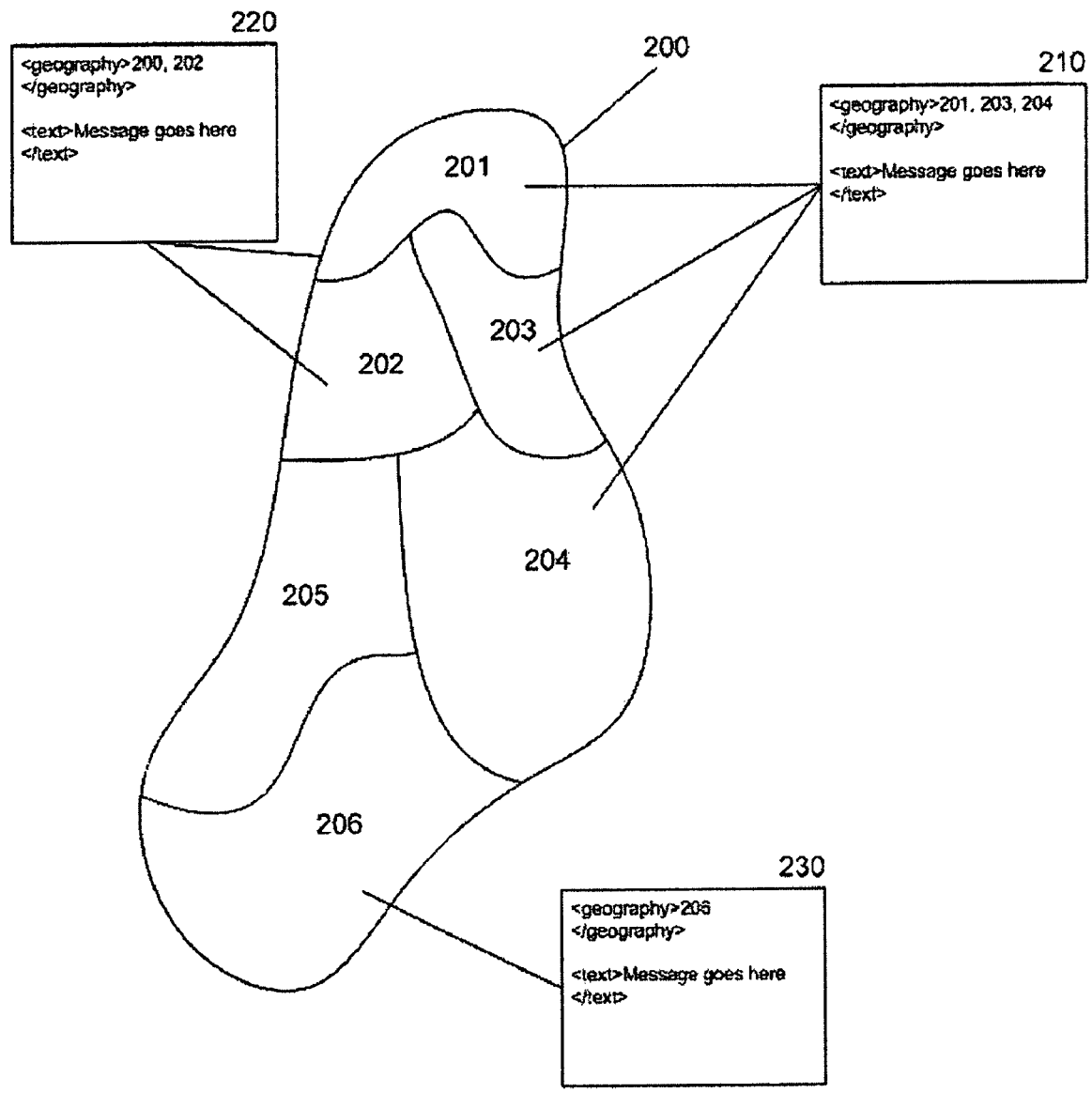
FIG. 2 illustrates a region divided into areas, and information classified in accordance with relevance to the various areas.

FIG. 2 shows a map illustrating a region 200 divided into a number of areas 201 through 206. A first information provider 210 may have information that is relevant to users in areas 201, 203 and 204. A second information provider 220 may have information relevant to the entire region 200 in general, and area 202 in particular. A third information provider 230 may have information that is only relevant in region 206.

According to the example illustrated in FIG. 2, the information provided by the first provider 210 would be available to any user in (or requesting information from) areas 201, 203 or 204, provided that they request local information. Information from the second information provider 220 will be available to users in area 202 requesting local or regional information, and to users requesting regional information in any of the other regions. Information from the third information provider 230 will only be available to users requesting local information in area 206.

According to principles consistent with some embodiments of the invention, an information provider may associate information not only with a geographical code, but also with a categorical code. One example of such a code could be a code based on the UNSPSC (Universal Standard Products and Services Classification) developed by the United Nations Development Programme (UNDP) and Dun & Bradstreet Corporation (D&B), but the invention is not limited to this example.

According to some embodiments of the invention, the information provider may combine the categorical codes and the geographical codes such that information may be relevant to some geographical area, while other information is available to a larger area. As an example, a pet store may sell live animals only locally, while feed may be shipped nationally. A simplified that serves to illustrate this is given below:

```
<message>
    <to>Our customers</to>
    <from>Pets Unlimited</from>
    <heading>Our recent offerings:</heading>
    <body>
        <product ID="Cats">
            <unspsc:code>10.10.15.01</unspsc:code>
            <geography>area1</geography>
            <text>Visit our store and see our cute kittens.</text>
        </product>
        <product ID="Cat food">
            <unspsc:code>10.12.18.00</unspsc:code>
            <geography>area1, area2</geography>
            <text>We ship cat food nationally!</text>
        </product>
    </body>
</message>
```

According to this example, the message "Visit our store and see our cute kittens." will be relevant only to people in area1, while the message "We ship cat food nationally!" will be relevant to people in area1 as well as area2. In this example, area1 could represent the city in which Pets Unlimited is located, while area2 could represent the country.

It should be noted that this example is intended to be illustrative only. In is not intended to follow the standards of the UNSPSC, and a more detailed system of codes, attributes, namespaces etc., would be necessary in a fully implemented system. However, these details will have to be developed as design choices by the skilled person, and will not facilitate any further understanding of the invention.

It will also be understood by those with skill in the art that other structures of the document could be developed. As an example, information with different categorical and/or geographical codes could be separated into individual documents. Also, instead of classifying each information item with both a categorical code and a geographical code, geographical codes could be associated with categorical codes such that each information item associated with a certain categorical code would automatically be relevant in an area or areas indicated by the geographical code(s) associated with that categorical code.

It will be realized that by simply providing an open geographical code that is freely accessible to all information providers, too many information providers may be tempted to simply provide their information everywhere and to everybody. Certain aspects that are consistent with the present invention serve to counteract this.

According to some embodiments of the invention, the geographical codes are assigned to information providers by the an authority with this responsibility. The system may then implement certain features in order to enforce this assignment, and this enforcement may be implemented in the central server 100.

Figure 3:
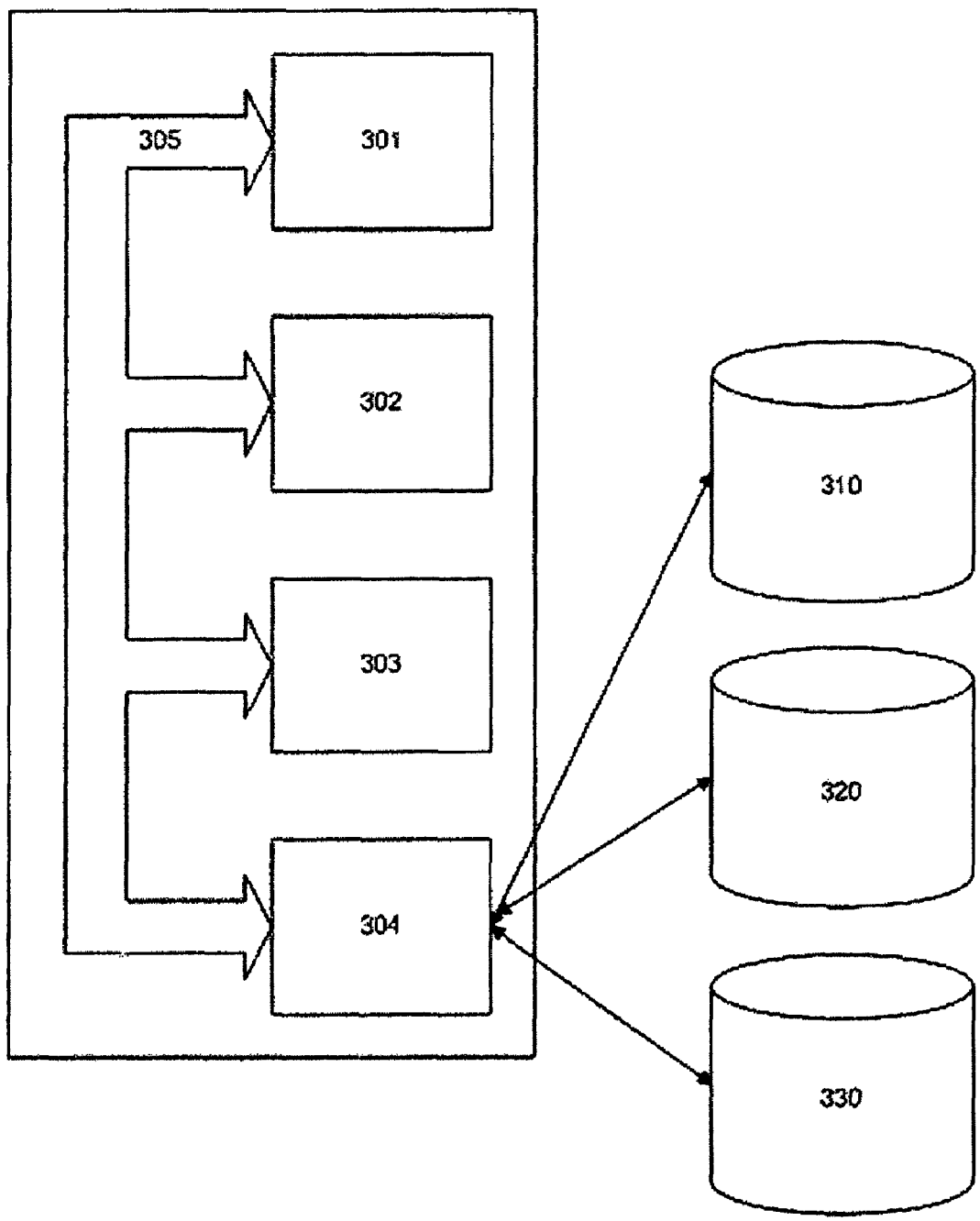
FIG. 3 illustrates a central server of the system in further detail.

Reference is now made to FIG. 3, which illustrates the central server in further detail. It should be understood that not all the components illustrated in this example are necessarily present in every embodiment that falls within the scope of the invention. It should also be understood that some components that are illustrated here as being distinct, may be implemented as part of the same component, or distributed over several components as a combination of software and hardware. As an example, the drawing shows several databases, but these databases could be implemented as information entered in various tables of one database.

According to the exemplary embodiment of FIG. 3, the central server may include a computer system 300 with one or more processing units 301, working memory 302, input/output interface 303, a database management system (DBMS) 304, all interconnected by a communications bus 305. The working memory 301 may include RAM, ROM, hard disk drives etc. for storing program instructions to be executed by the central processing unit(s) 301 acting upon stored or received data. The input/output interface 303 connects the server to the outside world, such as the communication network 106 illustrated in FIG. 1.

The central server 100 may further include one or more databases. A first database 310 may contain references to all the information provided by information providers. Alternatively, the database may contain the actual information after it has been uploaded from information servers 102.

The invention provides for several methods for entering the references (or the actual information) into the first database 310. According to a first embodiment consistent with the principles of the present invention, the central server 100 represents a search engine which retrieves information from servers connected to the network 106 e.g. as a web crawler. The retrieved information will be indexed and ranked according to methods that are known in the art, and references to the information will be stored in the database along with any indexing and ranking information. According to the present invention, some geographical categorization such as a geographical code, may also be associated with retrieved information, and this geographical code may be included in the entry for each information item.

According to a second alternative embodiment of the invention, information is submitted by information providers in the form of an identifier referencing the information, e.g. in the form of an URI. The computer system 300 may then be configured to retrieve information identified by the URI, extract any geographical code information from the retrieved information and store at least the reference URI and the geographical code in the database 310.

According to a third alternative embodiment, the geographical code is not embedded in the information at all, instead it is submitted separately along with the URI referencing the information, and stored in the database 310. According to this alternative the URI represents the association between the geographical code and the information.

Other alternatives could be contemplated by those skilled in the art without departing from the principles of the invention, as long as the information or a reference to the information (such as an URI) is entered along with a geographical code in the database 310.

In order to enforce the integrity of assigned geographical codes in the central server 100, several alternative embodiments are provided by the present invention.

According to a first alternative consistent with the present invention, the information provider never embeds any geographical code into the information. An URI (or the information itself is submitted to the central server 100, and the authority operating the central server, manually or automatically, assigns a geographical code in accordance with the provider's wishes. This information is then entered in the database 310. This embodiments ensures the integrity of the geographical codes, but may not be very flexible for the information provider.

According to a second alternative embodiment consistent with the present invention, an information provider submits an URI, a prefix part of an URI, or a domain name when requesting assignment of geographical codes. Since URIs and domain names by necessity are unique, the computer system 300 of the central server 100 may then, whenever entering new information in the database 310, check that the URI of that information and any associated geographical code, corresponds with an URI, prefix or domain previously submitted. This information may be stored in a second database 320. The second database 320 could also be used to store additional information about the information provider, an information provider profile. This information could include the information provider's address, and possibly also the coordinates of an exact location, in embodiments where the system is configured to display locations associated with the information provider e.g. on a map.

According to a third alternative embodiment consistent with the principles of the present invention, information providers are not assigned geographical codes, but unique ID codes or serial numbers. The ID codes may then be embedded in the information (or otherwise associated with an URI identifying the information), and the ID code may then be used to look up a geographical code in the central server 100.

According to a fourth alternative consistent with the invention, the geographical codes are encrypted before they are presented to the information providers, and decrypted by the central server 100 when entered in the database 310. Decryption keys may then be stored in a database 320. According to a further expansion on this alternative, and still consistent with the invention, geographical and categorical codes are combined and encrypted together. An information provider will then receive one or more combined encrypted codes that each may represent a certain combination of identified geographical areas and categories, possibly also associated with the information provider's identity, and URI or an URI prefix, or a domain. The information provider will then be able to use the codes correctly, but the codes cannot be re-used by others or modified without becoming corrupted.

When a method for protecting the integrity of the geographical codes have been implemented, the invention provides the operator of the central server 100 with a method for generating revenue from the information providers. Geographical codes can be assigned for a fee, and the payment model may be based on number and size of areas. This will make it possible to provide the information for free to the users, making the system ideal for advertising.

The central server 100 may include a third database 330 where user profiles may be stored. The user profiles stored in database 330 will be discussed in further detail below.

Figure 4:
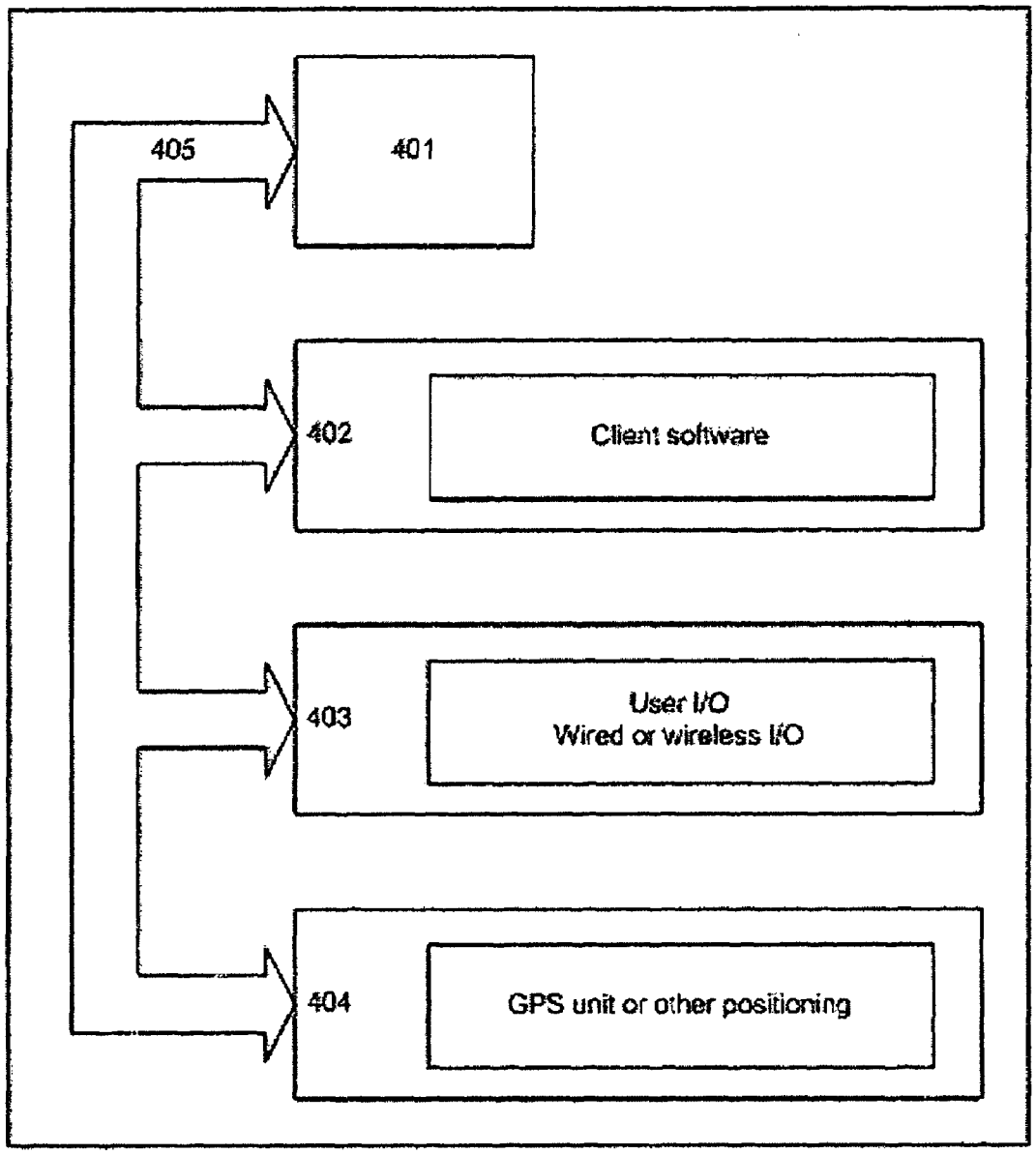
FIG. 4 illustrates a client device of the system in further detail.

Reference is now made to FIG. 4, which illustrates en exemplary embodiment of a user client device 104 that is consistent with principles of the invention. Such a device may be a personal computer, a PDA, a smart phone, or any other device capable of transmitting requests for information to a server on a network, receiving a response to such a request, and displaying the results.

The client device 104 as illustrated in FIG. 4 includes a processing unit 401, working memory 402, input/output interface 403, a positioning unit 404, all of which are interconnected by a communications bus 405. The working memory may store program instructions to be executed by the processing unit 401 to perform the functions of a client program. The client program may be designed to interact with the system according to the invention in particular, or it may be a general purpose program such as a web browser. If a general purpose web browser is used, the user may interact with the service by calling up a web page or a web application from the central server. Such a web page or web application may e.g. be stored in memory 302 and be available through http requests.

The input/output interface 403 is intended to represent any communication interface towards the network 106, as well as a user interface which may include a display, a keyboard a pointing device etc. The positioning unit 404 may be a GPS unit, or some other unit capable of finding the position of the device, e.g. by interacting with base stations in a cellular network in accordance with methods that are known to those skilled in the art.

In FIG. 4 the positioning unit 404 is shown as an integral part of the client device 104. However, the positioning unit may also be a separate unit connected to the device over the input/output interface 403. Alternatively, the positioning unit may not be present at all, and instead the user may have to enter the position over the user interface part of the input/output interface 404.

According to principles consistent with the invention, the user, when accessing the services provided through the implementation of the present invention, uses the client device 104 to send a request to the client server. The request will include information representative of the user's position. This information may be coordinates derived by the positioning unit 404. Alternatively, the position may be entered by the user, either as coordinates, or as a reference to a known position, e.g. the name of an area or region. In the latter case the reference to an area may be used directly by the central server 100, or may be translated to coordinates representative of the area in the server 100.

By using the real position, as derived by the positioning unit 404, the user may always receive information that is relevant to a current position. This may prove be useful even if the client device is a stationary personal computer. However, if the client device 104 is a PDA, a cellphone or some other device the user carries while traveling, it is particularly useful, since desired information about hotels, tourist information, local shopping, gas stations, traffic information etc., can be provided to a user who is not familiar with the surroundings.

If the user desires to obtain information pertinent to a future position, e.g. as part of the preparation for travel, the relevant position may be entered by the user by means of the user interface part of the input/output interface 403.

In addition to the geographical position information, the user may include additional information with the request. According to an embodiment consistent with the principles of the invention this information may simply be one or more search terms. Information may then be selected based on the degree to which the search terms are met and the positioning corresponds with geographical codes associated with the information.

According to an alternative embodiment consistent with the invention, the user establishes a user profile indicating preferred categories of information. This profile may then be stored in memory 402 on the client device and submitted along with the position information when the user sends a request to the central server 100. Alternatively, the profile may be stored in the central server 100 in a database 330, in order to be retrieved when the user logs in to the central server and sends a request including positional information.

FIG. 5 illustrates a user interface consistent with principles of the invention. This user interface may be part of an application installed on the client device 104, or it may be the result of the client device 104 making e.g. a http request to receive a web page or web application from the central server 100. In this exemplary user interface the user may enter a user name, select whether to enter a position manually or, in this case, retrieve the position from GPS, and enter a user profile.

In the example illustrated, the user has chosen to receive information related to food relevant to the city or the country the user is in, information on clothing if the information is relevant on a national level, and information on music relevant to the city the user is in. As a result of this specification, a code is generated. This code is a concatenated string of codes representing the selected categorical codes, in each case followed by a geographical code representing country, state and/or city, depending on the selections made by the user. In this case the following categorical codes are used:

| 10000001 | FOOD |
|---|---|
| 20000002 | CLOTHING |
| 30000003 | SPORTS |
| 40000004 | MUSIC |

And the geographical preferences are indicated as

| 100 | COUNTRY |
|---|---|
| 010 | STATE |
| 001 | CITY |

When the user sends a request for information to the central server, this string along with the current, or user selected, position is included. According to principles consistent with the invention, the preferences may be stored locally on the client device, they may be stored as a user profile on the central server, or the user may have to enter the preferences each time a request is made.

Figure 6:
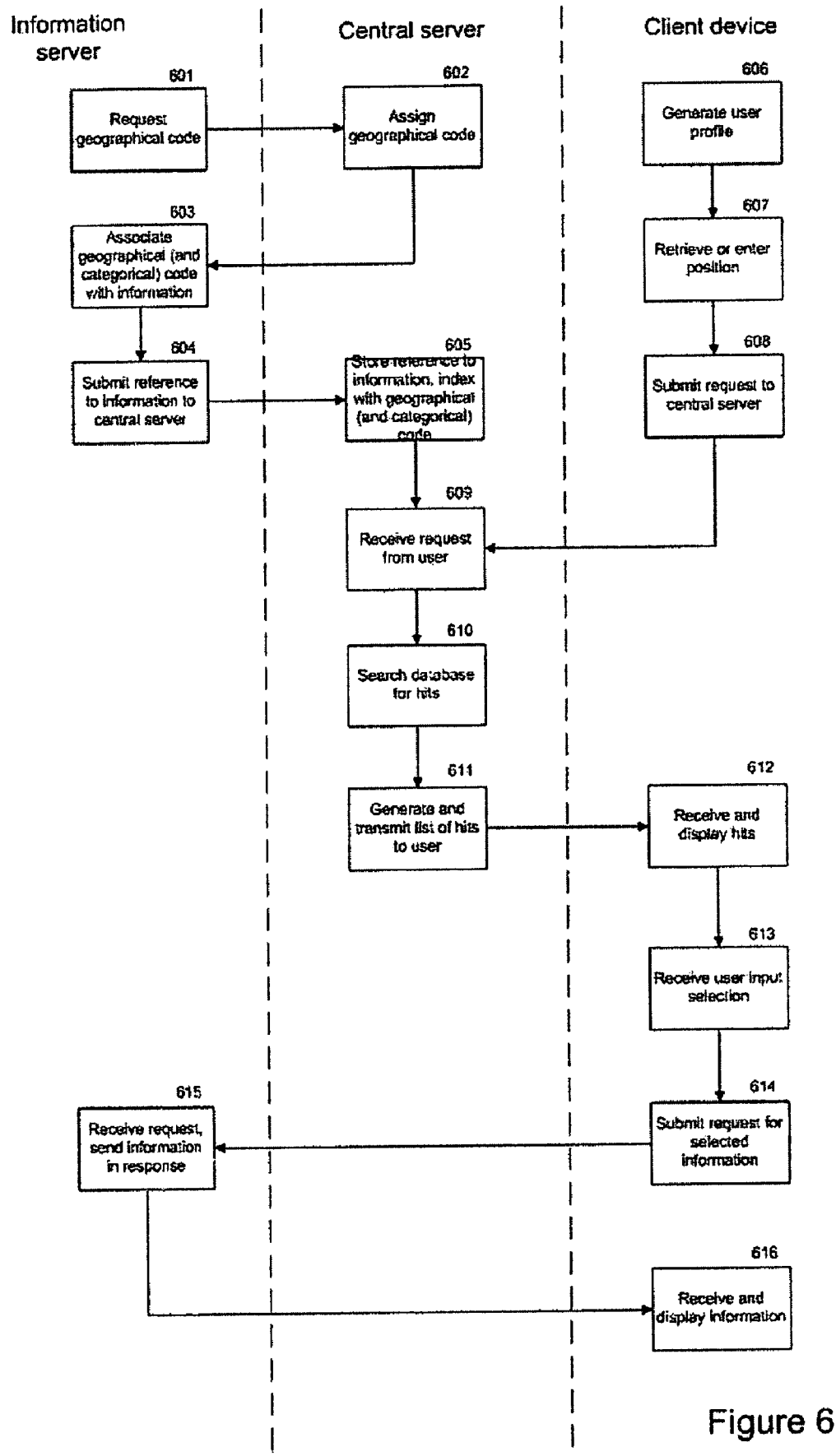
FIG. 6 is a flow chart showing how a method according to the invention could be performed.

Reference is now made to FIG. 6, where a flow chart illustrates how, according to an exemplary embodiment of the invention, the process of registering available information from an information provider on a central server and subsequently requesting that information from a client device may proceed. It will be realized that the details of this flowchart are exemplary, and that according to several embodiments consistent with the principles of the invention, some of the steps may be omitted or performed in a different manner or a different sequence than here illustrated.

In a first step 601, an information provider has information that should be associated with a geographical code and requests such a code from an administrating authority. If the code is openly available, this request may simply be a matter of looking up the correct code according to some standard. However, in the example illustrated, a request is sent to a central server 100 where the appropriate code is assigned and sent back to the requesting information server 102 in a step 602. As has already been described, the code can represent an area or a combination of areas, or possibly a central location and a radius. The code may also be encoded or encrypted, and it may be combined with a categorical code.

In a step 603 the received code is associated with the provided information. As has been described above, this association may be very direct and explicit in the sense that the code is embedded in the information as a tag or some other type of meta data, it may be stored in a separate file somehow linked with the information, or the association could be implicit, e.g. by way of the URI of the information also being stored in the central server 100 as a result of the initial request and assignment of the code.

A reference to the information can now be submitted to the central server 100 in a step 604. The central server 100 will then store this reference along with some indexing or other description of the information in a step 605, making it possible to find and retrieve the reference to the information in response to a request from a user.

It should, however, be noted that step 604 also may have been performed implicitly as part of the request 601, and that indexing and storing 605 may have been performed as part of the assigning of the code. It should also be noted that the step of submitting 604 may be an explicit action initiated by the information server 102, or it may be a result of actions performed by the central server 100 operating e.g. as a web crawler.

It should also be noted that according to embodiments consistent with the invention and as discussed above, the reference to the information may be replaced by the information itself. This would turn the central server 100 into a publication server, not only a portal or search engine.

The central server 100 will now wait for further actions, either for new registrations of information from an information provider, or for a request from a user.

In a step 606, a user operating a user's client device 104 generates a user profile. As hs been described above, the user profile may simply be a one time search request, or it may be a more detailed and more or less permanent indication of the user's preferences regarding categories of information and geographical locations for which the information should be relevant. When the user's profile has been established, a position is determined in a step 607. This position may be retrieved from a GPS, or it may be entered manually by the user. If the position is entered manually, it may be reflecting the user's actual position, or it may indicate a different position, e.g. a planned future position. It will be realized that the order of the steps 606 and 607 could be reversed or simultaneous, or one of the steps could be omitted if a default value or a previously generated value can be used.

A request including the user's profile and position may then be submitted to the central server 100 in a step 608, and received by the central server 100 in a step 609. If the system is so designed, the central server 100 may store the received user profile. According to embodiments where the central server 100 stores the user profile, subsequent requests from the user 608 may only include a reference to the previously generated user profile, e.g. in the form of a user name and a password, and an updated position. Of course, in such a case the user may be allowed to update the user profile at any time.

After the request has been received by the central server 100 in step 609, the central server 100 performs a search in the database 310 of registered provided information in a next step 610. Based on this search, a list of hits is generated and transmitted back to the user's client device 104 in a step 611. This list may typically be an html document presenting all the relevant hits as hyperlinks.

When the list of relevant hits is received by the client device a presentation is generated and displayed to the user in a step 612. This presentation may simply be the rendering of an html document in a web browser, but it should be noted that it would be within the scope of the invention to enhance the display of hits, e.g. by displaying a map with the location of each information provider indicated, displaying hits within different types of information in separate windows etc.

The user may then select any desired information, e.g. by clicking or tapping on a hyperlink in a displayed list, which will be received as input by the client device in a step 613. The client device will respond to the user input by submitting a request for selected information to an information server 102 in a step 614. The information server 102 and the referenced information may be identified by the URI that is part of the hyperlink. Of course, if the information itself is stored on the central server 100, the URI will reference information on the central server 100, and the request will go back to the central server 100.

When the request is received by the information server 102, the selected information is retrieved from memory and transmitted back to the client device 104 in response to the request. The information is then received and displayed by the client device 104 in a step 616.

Figure 7:
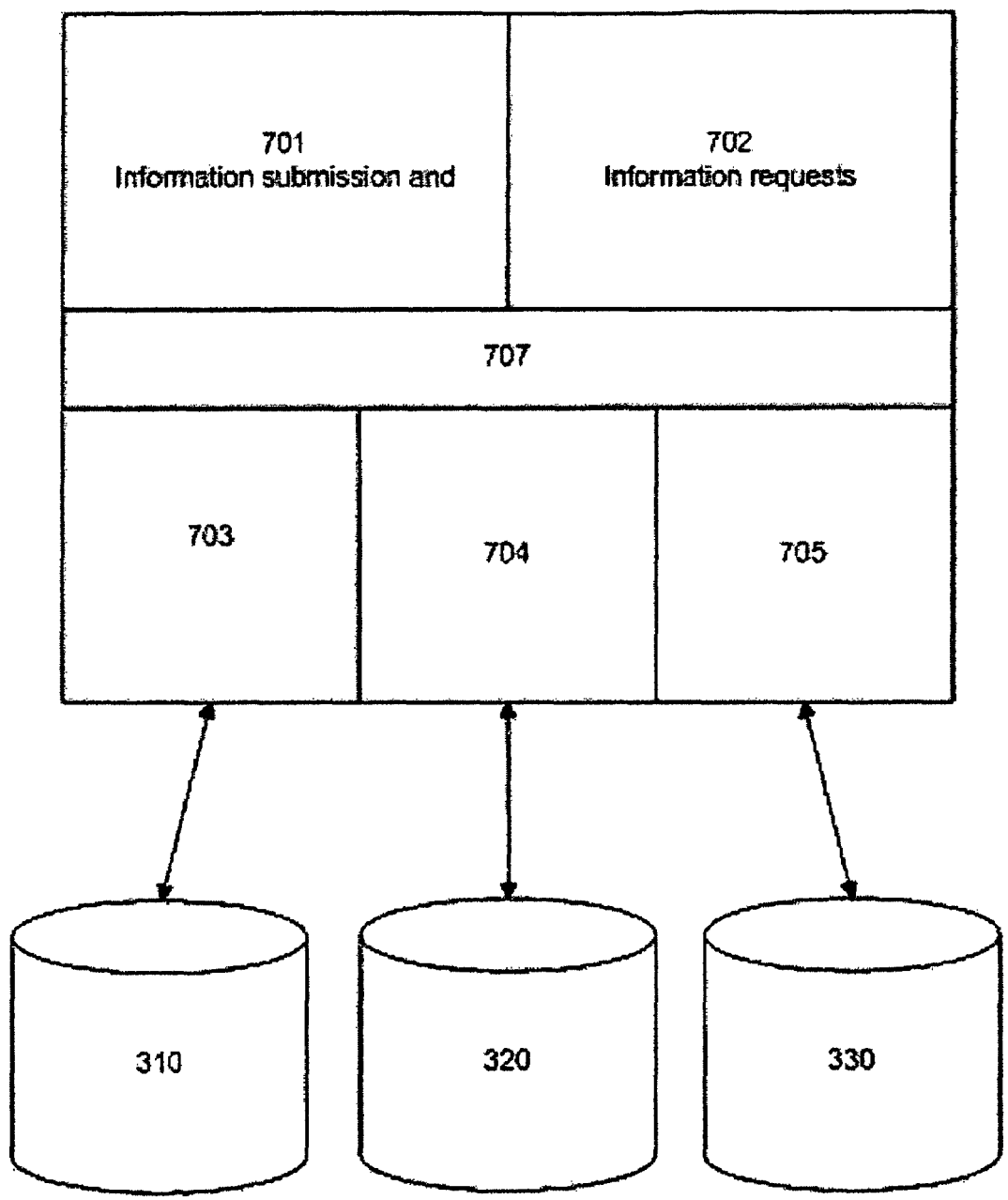
FIG. 7 is a block diagram illustrating a functional architecture of a central server.

Turning finally to FIG. 7, a block diagram illustrates a possible functional architecture of the server 100. The various modules illustrated in FIG. 7 may be realized as a combination of software code stored in working memory 302 and executed by processing unit 301, communication interface 303, and DBMS 304 (which itself may be a combination of software and hardware).

A first module 701 handles communication with the information providers 102 and may be a first web server with associated capabilities, a web crawler, or some other module capable of obtaining information from information providers, either automatically or through interaction with an information provider. This module may also provide information providers and/or system administrators with an interface over which registered information and information provider profiles may be administered.

A second module 702 handles communication with users and may be a second web server. The second module also may represent the front end, or user interface, of a search engine, and a user and/or administrator interface for administering user profiles.

A third module 703 represents the administration and management of the first database 310, and handles entry of information into the database and searches and retrieval of information from this database. This module may represent a combination of various functionality (possibly integrated with the first and second modules 701, 702) built on top of a database management system.

A fourth module 704 handles administration of geographical codes and information provider profiles, all of which are stored in the second database 320. The fourth module may represent a combination of various functionality (again possibly integrated with first and second modules 701, 702) built on top of a database management system. This module may be configured to generate unique geographical codes, encrypted geographical codes or codes that are stored locally and represented by a user identification code, a URI, a prefix part of a URI or a domain name in submitted information, and handle the administration of such data.

Finally, a fifth module 705 handles user profiles, and may be integrated with the second module 702.

In FIG. 7 a communication layer 707 represents the various modules communication with each other.

The skilled person will realize that the implementation of such modules may be done in a number of ways using programming languages such as PHP, Java, Perl, CGI scripts or more traditional programming languages interacting with e.g. an SQL based database management system. This, of course, means that functionality present in several modules may be programmed as only one module that can be invoked by other modules, and even that the various modules can be integrated in one module handling all functionality. Alternatively, functionality may be replicated or distributed, including distribution over several computers, servers, databases, and database management systems.

The communication between the various components of the system may follow standard protocols, such as hftp requests, but the choice of protocol is not an essential part of the invention, and other protocols and communication schemes could be used, as a design choice by the skilled person.

It should be noted that the term URI is used consistently in this specification, and is intended to cover both URLs and URNs. A URI may reference an actual resource such as a document or a data stream containing provided information, but in some cases the URI may simply be used as a unique identifier of information, an information provider, an XML namespace, etc., as will be realized by the skilled person.

The invention claimed is:

1. A system for providing information to a user, comprising:
a first database; and
one or more computer processors and memory programmed to perform:
a first process of receiving information including information items to be entered in said first database from at least one information provider, said information including at least data representative of a plurality of geographical codes defining associated information items as being relevant to respective geographical areas, and data representative of one or more categorical codes, each of said information items being associated with at least one of the geographical codes and at least one of the categorical codes, said geographical codes being chosen by said at least one information provider from a system of geographical codes representing a plurality of geographical levels;

a second process of receiving an information request from a user, said information request including at least data representative of a geographical position and data representative of a categorical preference, said categorical preference including a plurality of categorical codes each of which is associated with a geographical preference indicating one or more of said geographical levels; and a third process of:
  entering information items included in the information received by said first process in said first database as respective entries, the information items being entered in said first database in relation to said geographical codes and said categorical codes,
  searching said first database based on requests received by said second module,
  retrieving entries from said first database that have:
    an associated geographical code that corresponds with said geographical position and said geographical preference, and
    an associated categorical code that corresponds with said categorical preference, and
  transmitting a presentation of the retrieved entries to said user;
wherein said first process further receives a request for assignment of a geographical code from an information provider;
said one or more computer processors and memory being programmed to further perform:
  a fourth process of generating a geographical code in response to said request and transmitting data representative of said geographical code to said information provider;
  wherein said fourth process further encrypts said geographical code and transmits said encrypted code to said information provider as said data representative of said geographical code.

2. The system of claim 1, wherein said first process further transmits to an information provider a request for information in the form of a markup language input form and receives information submitted by said information provider by means of said input form.

3. The system of claim 1, wherein said first process further receives data representing a location on a computer network, downloads data from said location, and extracts said plurality of geographical codes and at least one categorical code from tags included in said downloaded data.

4. The system of claim 3, wherein said data representing a location is a URI of a web page associated with said information provider, and said data downloaded from said location is at least part of the data available from said web page.

5. The system of claim 1, wherein said geographical code is, or is representative of, at least one of an address, a postal code, a city, a region and a country.

6. The system of claim 1, wherein said categorical code is representative of a type of goods or a type of services.

7. The system of claim 1, wherein said categorical code is UNSPSC.

8. The system of claim 1, wherein said geographical position is provided by positioning means associated with a terminal operated by said user and said categorical preference is included in a user profile stored on said terminal.

9. The system of claim 8, wherein said positioning means is a GPS receiver or a cellphone capable of receiving or deriving positioning information from a cellphone network with which it is communicating.

10. The system of claim 1, wherein said geographical levels includes a first level of geographical codes referring to local areas, a second level of geographical codes referring to regional areas, and a third level of geographical codes referring to national areas.

11. The system of claim 1, wherein said presentation of retrieved entries is transmitted to said user as information that fulfills the criteria indicated in the request, or as one or MOM hyperlink references to information that fulfills the criteria indicated in the request.

12. The system of claim 1, wherein said second process further transmits to a user an invitation to request information in the form of a markup language input form and receive a request for information submitted by said user by means of said input form.

13. The system of claim 1, further comprising:
  a second database; and
  wherein said fourth process further enters said generated geographical code as part of an information provider profile in said second database, and transmits an association with said information provider profile to said information provider as said data representative of said geographical code.

14. The system of claim 13, wherein said association is an information provider identification code representing said information provider profile, or a URI, a prefix part of a URI or a domain name associated with said information provider and stored in said information provider profile.

15. The system of claim 1, wherein:
  said second process further receives a request for establishment of a user profile including a categorical preference from a user,
  said system further comprises:
    a third database, and
  said one or more computer processors are programmed to further perform:
    a fifth process of generating a user identification code, entering, said user identification code and said categorical preference as part of a user profile in said third database, and transmitting said user identification code to said user such that said user identification code can be used as said data representative of a categorical preference in a request for information.

16. Method for providing information to a user, comprising:
  utilizing one or more computer processors and memory to execute a process including:
    receiving information including information items from at least one information provider, said information including at least data representative of a plurality of geographical codes defining associated information items as being relevant to respective geographical areas and data representative of one or more categorical codes, each of said information items being associated with at least one of the geographical codes and at least one of the categorical codes, said geographical codes being chosen by said at least one information provider from a system of geographical codes representing a plurality of geographical levels;
    entering information items included in the received information in a first database as respective entries, the information items being entered in relation to said geographical codes and said categorical codes in said first database;
    receiving an information request from a user, said information request including at least data representative of a geographical position and data representative of a categorical preference, said categorical preference including a plurality of categorical codes each of which is associated with a geographical preference indicating one or more of said geographical levels;

searching said first database based on said request;

retrieving entries from said first database that have;
   an associated geographical code that corresponds with said geographical position and said geographical preference, and
   an associated categorical code that corresponds with said categorical preference; and transmitting a presentation of said retrieved entries to said user;

wherein the executed process further comprises;

receiving a request for assignment of a geographical code from an information provider; and generating a geographical code in response to said request; and transmitting data representative of said geographical code to said information provider;

encrypting said geographic code; and transmitting said encrypted code to said information provider as said data representative of said geographical code.

17. The method of claim 16, wherein the executed process further comprises;
   transmitting a request for information to an information provider in the form of a markup language input form; and
   receiving information that is submitted by said information provider by means of said input form.

18. The method of claim 16, wherein the executed process further comprises:
   receiving data representing a location on a computer network;
   downloading data from said location; and
   extracting said plurality of geographical codes and at least one categorical code from tags included in said downloaded data.

19. The method of claim 18, wherein said data representing a location is a URI of a web page associated with said information provider, and said data downloaded from said location is at least part of the data available from said web page.

20. The method of claim 16, wherein said geographical code is, or is representative of, at least one of an address, a postal code, a city, a region and a country.

21. The method of claim 16, wherein said categorical code is representative of a type of goods or a type of services.

22. The method of claim 16, wherein said categorical code is UNSPSC.

23. The method of claim 16, wherein said geographical position is provided by positioning means associated with a terminal operated by said user and said categorical preference is included in a user profile stored on said terminal.

24. The method of claim 23, wherein said positioning means is a GPS receiver or a cellphone capable of receiving or deriving positioning information from a cellphone network with which it is communicating.

25. The method of claim 16, wherein said geographical levels includes a first level of geographical codes referring to local areas, a second level of geographical codes referring to regional areas, and a third level of geographical codes referring to national areas.

26. The method of claim 16, wherein said presentation of retrieved entries is transmitted to said user as information that fulfills the criteria indicated in the request, or as one or more hyperlink references to information that fulfills the criteria indicated in the request.

27. The method of claim 16, wherein the executed process further comprises:
   transmitting to a user an invitation to request information in the form of a markup language input form; and
   receiving a request for information submitted by said user by means of said input form.

28. The method of claim 16, wherein the executed process further comprises:
   entering said generated geographical code as part of an information provider profile in a second database; and
   transmitting an association with said user profile to said information provider as said data representative of said geographical code.

29. The method of claim 28, wherein said association is an information provider identification code representing said information provider profile, or a URI, a prefix part of a URI or a domain name associated with said information provider and stored in said information provider profile.

30. The method of claim 16, wherein the executed process further comprises:
   receiving a request for establishment of a user profile including a categorical preference from a user;
   generating a user identification code;
   entering said user identification code and said categorical preference as part of a user profile in a third database; and
   transmitting said user identification code to said user such that said user identification code can be used as said data representative of a categorical preference in a request for information.

\* \* \* \* \*